Aug. 19, 1941.    A. W. KATH ET AL    2,253,301
CAPSULE FORMING MECHANISM
Filed Jan. 9, 1939    5 Sheets-Sheet 5

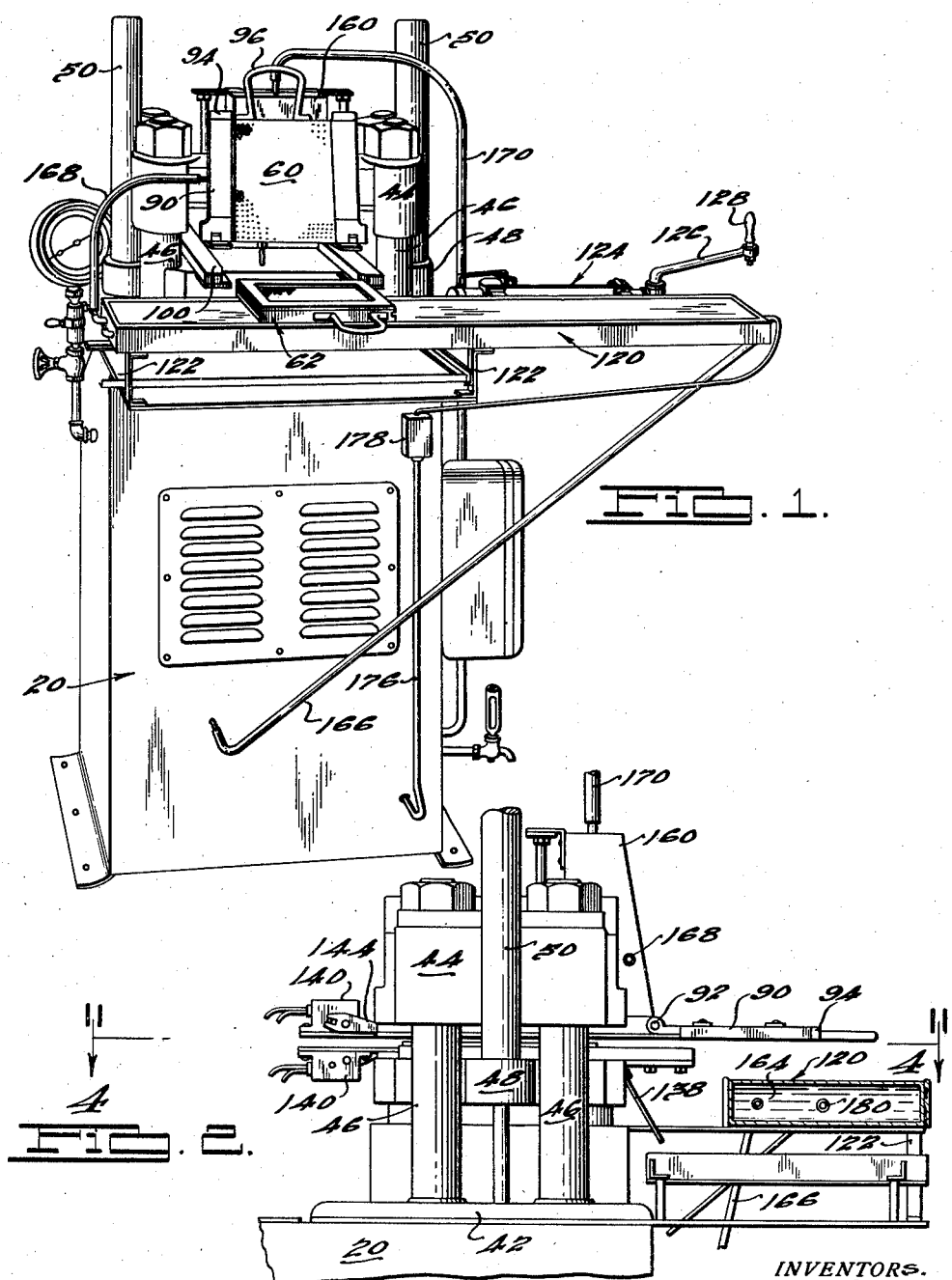

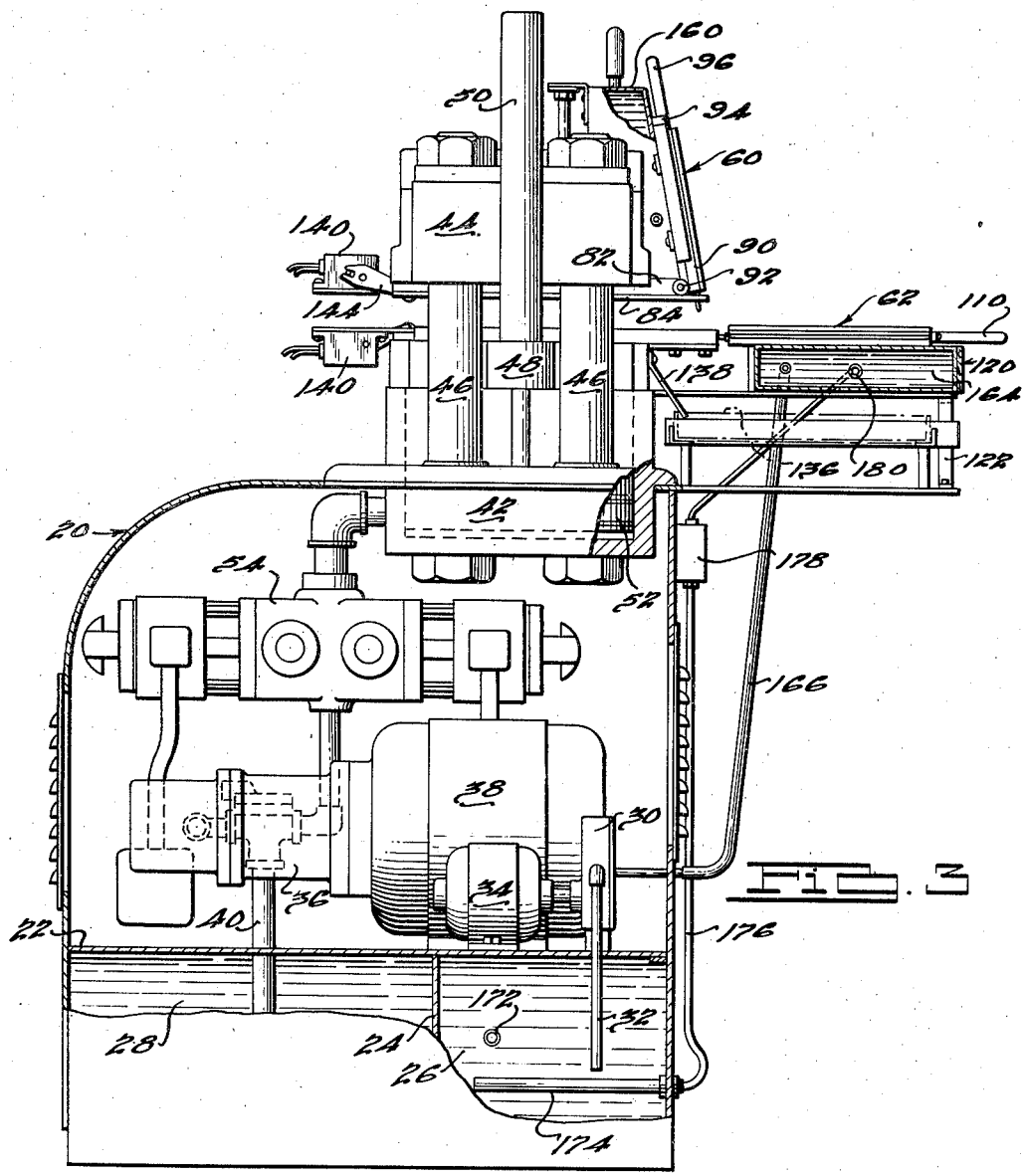

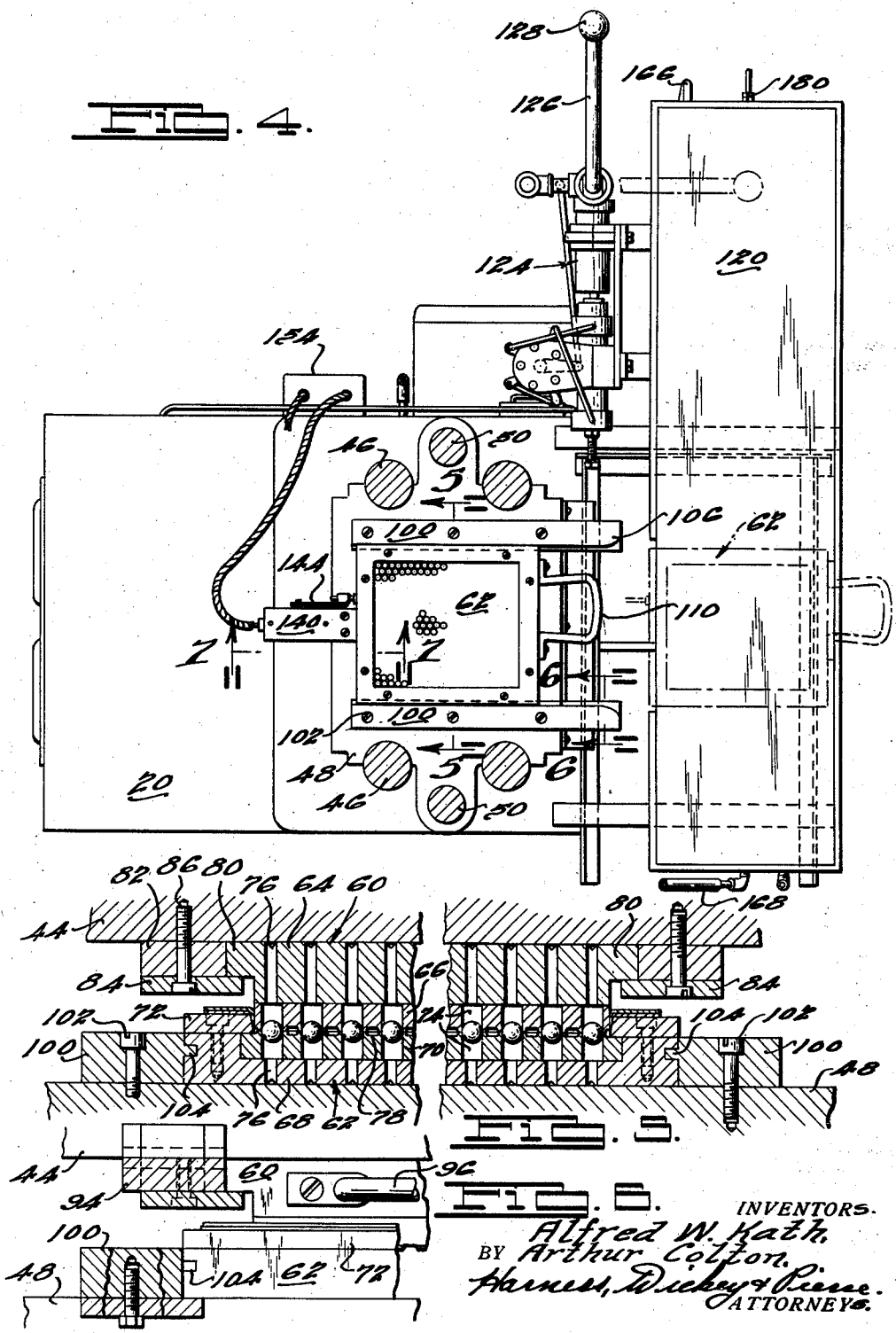

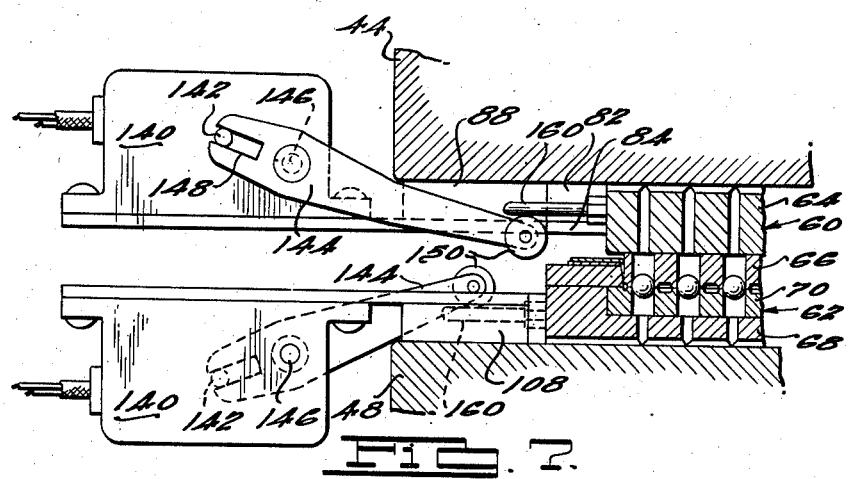
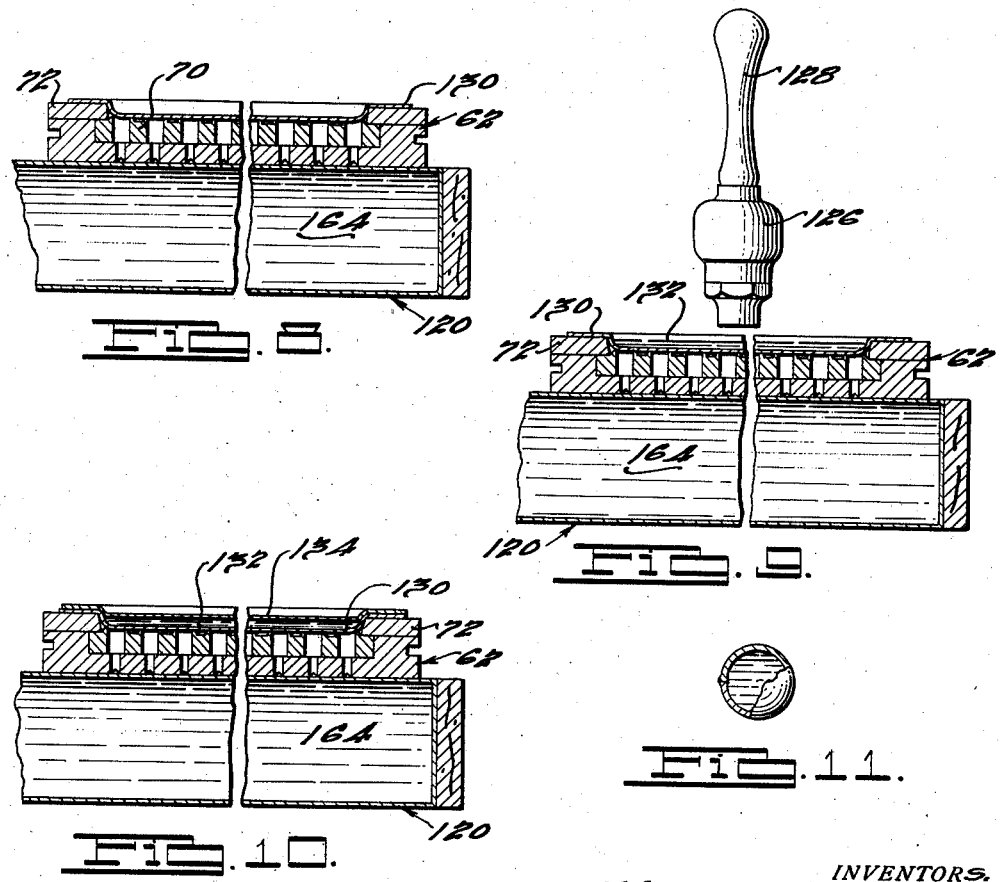

INVENTORS.
Alfred W. Kath,
BY Arthur Colton.
Harness, Dickey & Pierce.
ATTORNEYS.

Patented Aug. 19, 1941

2,253,301

UNITED STATES PATENT OFFICE 2,253,301

CAPSULE FORMING MECHANISM

Alfred W. Kath and Arthur Colton, Detroit, Mich., assignors to Arthur Colton Company, Detroit, Mich., a corporation of Michigan Application January 9, 1939, Serial No. 249,913

10 Claims. (Cl. 18—21)

This invention relates to capsule forming mechanism and particularly to mechanism for forming liquid filled gelatine capsules, the principal object being the provision of mechanism of this type that will greatly facilitate the production of such capsules, and that is efficient and economical in use.

Other objects of the invention include the provision of mechanism for forming liquid filled gelatine capsules in which the ring, employed in accordance with conventional practice to align the two die halves during the pressing operation, is eliminated, thereby enabling two parts, instead of three parts as in conventional constructions, to be employed; mechanism for forming liquid filled gelatine capsules including a press and a pair of dies, the dies being movable independently of one another into and out of operative relation with respect to the press; the provision of mechanism for forming capsules of the type described including a press and a pair of die halves, the die halves being slidably associated with the respective platens of the press; the provision of mechanism of the type described in which one of the die halves is permanently but slidably associated with one of the press platens; the provision of mechanism of the type described in which the press platens are provided with means for slidably guiding the die halves for independent movement; the provision of mechanism of the type described in which guiding means are provided in connection with one of the press platens whereby upon the completion of the pressing operation the corresponding die half may be withdrawn from its platen and moved to a position to expose its operative face; the provision of a construction as above described wherein the lower die half is completely removable from the cooperating press, thus enabling a plurality of lower die halves to be employed, one after the other, with a single upper die half, this permitting one or more lower die halves to be loaded while another is being subjected to a pressing operation; the provision of a construction as above described in which, when the die half is removed from the platen and into a position to expose its operative face it is moved into contact with heating means whereby to maintain it at a desired temperature; the provision of mechanism of the type described in which movement of both of the die halves into proper operative relation with respect to the platens of the press is a condition precedent to the operation of the press; and the provision of a construction as above described in which the movement of the die halves into operative relation with respect to both platens of the press serves to effect actuation of the press.

Further objects of the invention include the provision of mechanism for forming liquid filled gelatine capsules including a press and die means movable into and out of operative relation with respect to the press together with means for supporting the die means exteriorly of the press which will act to maintain the die means at an elevated temperature; the provision of mechanism for forming liquid filled gelatine capsules including a press and an associated table adapted to support a die member when removed from the press, the die member being adapted to receive a gelatine sheet thereon, and liquid measuring means being associated with the table for depositing a predetermined charge of liquid onto the gelatine sheet supported by the die means while supported by the table; the provision of mechanism of the type described in which the surface of the table is in substantial horizontal alignment with one of the platens of the press and such platen is constructed to slidably receive such die member whereby the die member may be slid directly from the table into operative position with respect to the platen; the provision of a construction as above described in which means are provided for maintaining the table at an elevated temperature whereby the die part received thereby will be heated; and the provision of mechanism of the type described including a table for receiving one die part and a pad for receiving another die part, the table and the pad being provided with liquid circulating mechanism and being connected in a liquid circulating system whereby to enable the table and the pad to be maintained at predetermined temperatures.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a perspective front elevational view of a machine embodying the present invention illustrating the press platens in separated position and the two operative halves of the die withdrawn from between the platens;

Fig. 2 is a fragmentary, partially broken, partially sectional side elevational view of the machine shown in Fig. 1 but with the die halves received in operative position between the platens of the press and the platens of the press in closed position;

Fig. 3 is an enlarged, partially broken, partially sectioned side elevational view of the machine shown in the preceding figure with the near side wall broken away to illustrate the tanks and pumping mechanism contained within the base portion of the machine and certain other parts broken away or shown in section to better illustrate the construction;

Fig. 4 is a horizontal sectional view taken on the line 4—4 of Fig. 2;

Fig. 5 is an enlarged, broken, vertical sectional view taken on the line 5—5 of Fig. 4 and particularly illustrating the die structure when the dies are in closed position and the means for slidably mounting them upon the platens of the press;

Fig. 6 is an enlarged fragmentary vertical sectional view taken on the line 6—6 of Fig. 4;

Fig. 7 is an enlarged fragmentary vertical sectional view taken on the line 7—7 of Fig. 4 and particularly illustrating the control means for the press which are operated by the die halves;

Figs. 8, 9 and 10 are fragmentary, broken, vertical sectional views taken through the lower die member in position on the table to illustrate successive steps of operation in connection therewith preparatory to moving the die member onto the lower platen of the press to form a plurality of liquid filled gelatine capsules thereby;

Fig. 11 is a partially broken, partially sectioned view of a liquid filled gelatine capsule such as may be formed by the mechanism shown in the preceding views.

Figure 12:
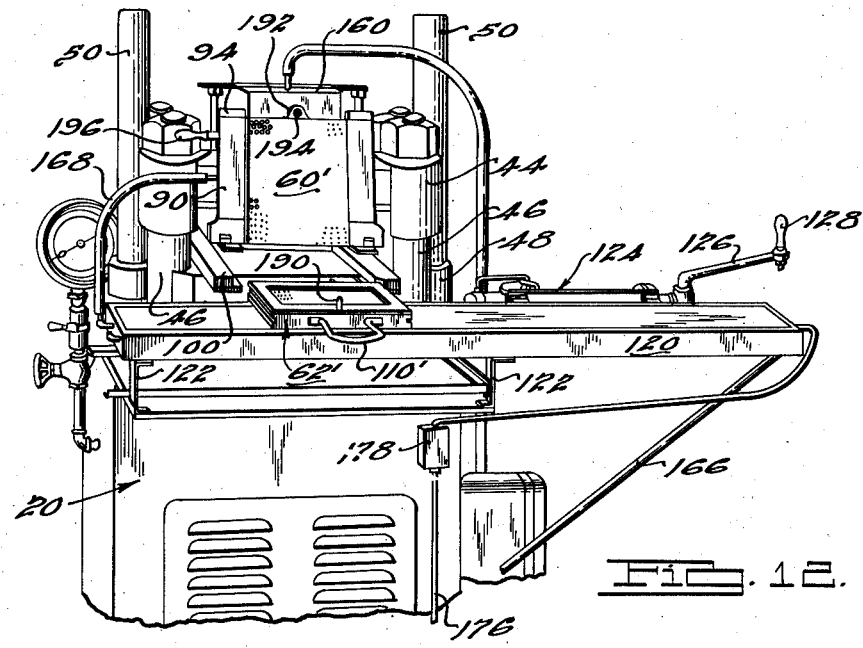
Fig. 12 is a fragmentary perspective view similar to that shown in Fig. 1, but illustrating a modified construction for the capsule forming dies wherein they are aligned with each other for the pressing operation in a different manner than that illustrated in the previous figures.

As is commonly understood in the art, in the manufacture of liquid filled gelatine capsules by a press operation, a pair of die halves or members are employed the matching faces of which are provided with a plurality of depressions or openings.

In the past conventional practice has been to form an upper die half, a lower die half, and a cooperating ring, the ring being employed for aligning the two die halves for the pressing operation as well as for clamping the marginal edges of the gelatine sheets together for the purpose of the pressing operation. Thus each die assembly required the use of three separate members. Under such circumstances it has been necessary in the operation of making such capsules to place a sheet of gelatine over the lower die half and cause it to sag therein into more or less pan-like formation, place the required quantity of liquid in this depression, place the remaining sheet of gelatine over the top of the first sheet and the liquid contained therein, apply the ring over the bottom die and the marginal edges of the two sheets of gelatine thus positioned, insert the top die in the ring, then insert the whole assembly in a press, and then operate the press to bring the two halves of the die into contact with each other and thus form the capsules. It will be appreciated that these three parts of the die structure require handling as a unit which, in the larger sizes in particular, result in a relatively heavy and awkward object to handle and to move to its proper position within a press. By the use of the present invention the ring of conventional construction is eliminated entirely together with the expense thereof, and the two die halves themselves are each independently movable into and out of operative relation with respect to each other and in some instances with respect to the press, resulting in materially smaller parts to be handled by the workman or operator and enabling the operation to be accomplished in a much easier, simpler and more economical manner. Additionally, it is desirable to maintain the die halves at a more or less elevated temperature so as to render the gelatine sheets and particularly the opposed faces thereof in a more or less tacky condition so as to facilitate the weld between the two sheets of gelatine about the margins of each of the capsules formed. The control of the temperature of the die halves in this respect has not heretofore been attempted probably because of the difficulty of accomplishing the desired results in the employment of conventional methods.

In accordance with the present invention the die halves are removably associated with the press platens so that upon the completion of each operation the die halves may be removed from the platens whereby to expose them for ready and quick removal of the capsules and waste formed in the preceding operation, and to render the lower die half accessible in an unrestricted manner for the application of new gelatine sheets and liquid fill thereto. The lower die half is preferably completely removable with respect to the corresponding platen of the press whereby a plurality of lower die halves may be employed and independently loaded with gelatine sheets and liquid fill. This makes it possible to operate the press as fast as it is possible to remove only the lower die half, clean the capsules and waste from the upper die half, insert a new loaded lower die half and replace the upper die half in position between the platens of the press and bring the platens together, the lower die half from the preceding operation being removed to a position remote from the press proper, if desired, for removal of the capsules and waste therefrom and for re-loading with additional sheets and liquid fill for a subsequent operation. Preferably the upper die half is permanently but movably associated with its corresponding platen of the press permitting it to be withdrawn from operative relationship with respect to such platen after each operation and preferably so mounted as to enable it to be moved out of possible interfering relationship with respect to a lower die half and its charge.

Furthermore, in accordance with the present invention a table is preferably provided for the lower die half or halves for supporting the same thereon and such table is preferably provided with means for maintaining it at a predetermined elevated temperature whereby the lower die half portions through their contact therewith will be suitably elevated in temperature. Means are also preferably provided in conjunction with the upper die half so that each time that it is withdrawn from its operative position within the press and moved to inoperative position exteriorly thereof it will lie in contact with a heated pad or support whereby its temperature may also be suitably elevated.

Thus by means of the present invention mechanism is provided rendering the die halves fully exposed after each operation in the press for operations to be performed thereon, thus facilitating and speeding up such operations; it permits the use of a plurality of independent lower die halves or members with a single upper die half, thus eliminating the delay and expense in press operations formerly occasioned by the necessity of assembling the die halves and ring prior to insertion in the press; and provides means whereby the gelatine sheets may be maintained in a condition most favorable to the quick and efficient welding of the two gelatine sheets together about the periphery of the capsules being formed.

Referring now to the accompanying drawings and particularly to Figs. 1, 2, 3 and 4, the machine illustrated will be seen to include a supporting cabinet or base indicated generally at 20 and preferably formed from sheet metal into a hollow structure of more or less box-like form. As indicated best in Fig. 3 it will be noted that the base 20 is provided with a horizontal intermediate wall 22 the space below which and the bottom of the base 20 is divided by a vertical wall 24 into a water containing chamber 26 and an oil containing chamber 28. Mounted upon the wall 22 is a water pump 30 having an intake pipe 32 extending to a point adjacent the bottom of the water tank 26 and provided with an electric motor 34 for driving the same. An oil pump 36 supported upon the end of an electric motor 38 forms a unit also supported upon the wall 22 and the pump 36 is provided with an intake pipe 40 which projects downwardly into the oil tank 28 to a point adjacent the bottom thereof.

Suitably secured upon and supported by the top wall of the base 20 is the base 42 of an hydraulic press including an upper platen 44 mounted upon and fixed with respect to the base 42 by a plurality of vertically extending posts 46, and a lower platen 48 suitably guided for vertical movement by means of a pair of vertically extending guides or posts 50 and having associated pistons or plungers 52 in the base 42 for effecting vertical movement thereof. The hydraulic press portion of the apparatus is conventional per se and is operated by pressure supplied from the oil pump 36 and as fed to it and discharged from it through a conventional form of electrically operated control valve 54 interposed between the pump 36 and the press, the operation of the valve 54 being controlled in a novel manner in accordance with the present invention as will hereinafter be more fully described.

The die halves are best shown in Figs. 4 and 5 in which the upper die half is indicated generally at 60 and the lower die half generally at 62. The particular construction of the die halves and the particular conformation and arrangement of the capsule forming openings therein forms no part of the present invention and may be of any suitable or conventional design and construction as far as the present invention is concerned. However for the purpose of illustration the upper die half 60 is shown as including a base 64 and a forming portion 66 which may be suitably secured thereto in any conventional or desirable manner. The lower die half 62 likewise comprises a base 68 and a forming portion 70. In the case of the lower die half 62 the forming portion 70 is set into the surface of the base 68 so that its upper surface is substantially flush therewith and a clamping element or frame 72 is secured to the upper face of the base 68 with its inner edge marginally overlapping the upper outer edge of the forming portion 70 not only to hold the forming portion 70 in place within the base 68 but for an additional purpose which will be apparent later. The forming portions 66 and 70 are provided therethrough with a plurality of matching circular openings 74 which form the capsule forming recesses and the bases 64 and 68, respectively, are each provided with small openings 76 in alignment with each of the recesses 74, the outer ends of which are suitably vented to the atmosphere, so as to provide vents for the openings 74 to discharge air therefrom as required during formation of the capsules. It will also be noted that opposed faces of the forming portions 66 and 70 are relieved as indicated at 78 at all points except immediately surrounding the margins of the various openings 74 whereby to provide conventional cutting edges around such margins for facilitating the severance of the gelatine strips during the pressing operation.

Also as best indicated in Fig. 5 the opposite sides of the base 64 for the upper die half 60 are each formed to provide an outwardly extending flange 80 which extends the full length of the corresponding side. In order to slidably support the upper die half 60 on the upper platen 44 of the press, a pair of bar members 82 are provided on the underface of the upper platen 44 spaced from each other a distance corresponding to the distance between the outer edges of the flanges 80 and the upper die half 60 is received against the lower face of the upper platen 44 between the bar members 82. Plate members 84 overlying the lower face of the bar members 82 project inwardly beyond the inner margins of the bar members 82 into overlapping relationship with respect to the lower faces of the corresponding flanges 80, and screws 86 passing upwardly through the corresponding plates 84 and bar members 82 thread into the platen 44 to rigidly secure the bar members 82 and plates 84 in position. As will be readily appreciated the bar members 82 and plates 84 provide means for supporting the upper die half 60 in contact with the lower face of the upper platen 44 and in such a manner as to permit sliding movement of the upper die half 60 longitudinally of the bar members 82. Rearward movement of the upper die half 60 in the slide thus formed by the bar members 82 and plates 84 is positively limited by means of a suitable block 88 secured to the lower face of the platen 44 adjacent the rear end thereof as indicated in Fig. 7.

As indicated best in Fig. 3, the forward ends of the bars 82 and plates 84 project forwardly beyond the forward face of the platen 44 and supplementary guides or slides 90, aligned with the slides formed by the bar members 82 and 84 and of a cross-sectional configuration complementary thereto, are pivoted as at 92 to the slides 82, 84, the pivotal connection being such that while the guides 90 may be freely pivoted upwardly about the pivot points 92 from a horizontal position, they are limited in their downward movement to a position in which they are in horizontal alignment with the guides 82, 84. The guides 90 are slightly longer than the corresponding die half 60 so that the latter may be completely received and supported thereby. Outward movement of the associated die part 60 beyond the ends of the guides 90 is prevented by stop members 94 secured to the ends of the guides 90. Accordingly, when the guides 90 are in their horizontal position as indicated in Fig. 2 the upper die half 60 may be slid between the guides 90 and the guides 82, 84 from a position completely received below the upper platen 44 to a position in which it is completely received within the guides 90 and in which position it may be pivoted with the guides 90 upwardly about the pivot points 92 to a position such as indicated in Figs. 1 and 3 in which its lower face is completely exposed. Preferably as indicated best in Fig. 3 this position is slightly more than 90 degrees from the position illustrated in Fig. 2 so that the force of gravity will hold it in its fully opened position. A handle 92 is preferably secured to the outer edge face of the die half 60 so as to facilitate manual operation thereof as described.

Also as best indicated in Figs. 4 and 5 a pair of guides 100 are fixed by means of screws 102 to the upper face of the lower platen 48 with their inner faces in spaced and parallel relation for slidably receiving the sides of the lower die half 62 therebetween. The inner edges of each guide 100 are preferably provided with an inwardly projecting tongue 104 received in a complementary groove in the opposed edge face of the lower die half 62 so as to prevent relative vertical movement between the lower die half 62 and the platen 48 when the lower die half is confined between the guides 100. The guides 100, as indicated in Fig. 4, extend outwardly to a point slightly beyond the forward face of the press and the forward inner edges thereof are preferably outwardly flared as at 106 to facilitate the insertion of a lower die half 62 thereinto. As indicated best in Fig. 7 stop means 108 are provided on the upper surface of the platen 48 adjacent the rear edge thereof for contact with the rear edge of the lower die half 62 so as to positively limit movement thereof between the guides 100 in a rearward direction. As will be appreciated the lower die half 62 may be completely withdrawn from the upper platen 48 by simply sliding it forwardly from between the guides 100, a handle 110 fixed to its forward edge being provided for facilitating this movement as well as for ease in handling such lower die half. It will, of course, be understood that the guides 82, 84 and the guides 100 are secured to their corresponding faces of the platens 44 and 48 so as to insure alignment of the opposed openings 74 in the corresponding die halves when the die halves are received by their respective platens and moved rearwardly therein against corresponding stops 82 and 108, respectively.

From the description thus far given it will be understood that means are provided for slidably supporting the upper die half 60 against the lower face of the upper platen 44, that means are provided for positively limiting inward movement of the upper die half in such guides, and that when the pivoted guides 90 are in the horizontal position indicated in Fig. 2 the upper die half 60 may be withdrawn outwardly to a position between the guides 90 and then pivoted upwardly with such guides to the position indicated in Figs. 1 and 3 in which the lower face of the upper die half is completely exposed exteriorly of the machine for cleaning or other operation. It will also be understood that the lower die half 62 is slidably supported upon the upper face of the lower movable platen 48 and is guided for movement with respect thereto by the guide members 100 so associated with the guide members for the upper die half 60 as to enable accurate alignment of the upper and lower die halves. It will also be understood that the lower die half 62 may be withdrawn completely from the lower platen 48 and from between the guides 100, thus enabling it to be withdrawn completely from the press so that it may be conveniently tipped to discharge any capsules or waste carried by it as a result of the pressing operation, and permit it to be transported to any convenient location for re-loading or any other operation in connection therewith. It will also be understood that where two or more of such lower die halves 62 are provided in connection with the press, while one die half 62 is being inserted in the press and subject to an operation in the press, the other die half or die halves, as the case may be, may be simultaneously subjected to a filling operation whereby as soon as the operation then occurring in the press is completed and the corresponding lower die half is removed, a different and fully loaded lower die half may be immediately re-inserted in the press for operation therein without requiring the passage of such time interval as would otherwise be required in order to re-load the same lower die half as was just removed from the press in the last preceding operation. It will be readily appreciated by those skilled in the art that by thus removing the die halves from between the platens of the press and exposing them to convenient and ready manipulation exteriorly of the press, and by permitting the use of two or more lower die halves for successive loading in operation, the capacity of a press may be materially increased as compared to conventional practices.

In order to facilitate the handling of the lower die halves 62, insertion and removal thereof into and from the press, and the loading of the lower die halves 62, a table indicated generally at 120 is suitably supported from the base 20 on the forward side thereof as by means of brackets 122 with its upper surface in substantially flush relationship with respect to the upper surface of the platen 48 when in its inoperative or lower position as best illustrated in Fig. 3. The table 120 is of a width preferably commensurate with the length of the lower die half 62 and extends over the full width of the press and projects a material distance beyond one side thereof as indicated in Figs. 1 and 4. Accordingly, the table 120 provides a support for the lower die halves 62 during the insertion thereof between the guides 100 and upon removal therefrom. It also provides a means whereby the lower die half may be loaded with the proper gelatine sheets and liquid fill at one end of the table, be slid along the table to a position aligned with the guides 100 and then moved directly into the press between the guides 100. In order to facilitate the operation of loading the lower die halves 62, a conventional form of liquid measuring and discharge device indicated generally at 124 is preferably supported on the rear face of the table 120 as indicated in Figs. 1 and 4. This liquid measuring and discharge device includes a movable spout 126 provided with a handle 128 which spout, when moved by the handle 128 over the table 120 as illustrated in dotted lines in Fig. 4, effects operation of the device 124 to discharge a measured quantity of liquid through the spout 126.

Accordingly, in following out the operations of the mechanism thus described, and particularly referring to Figs. 8, 9 and 10, a lower die half 62 is placed upon the righthand end of the table 120 as viewed in Fig. 1, and a sheet of gelatine 130 of suitable size and thickness is laid over the upper surface of the frame member 72 and the central portion of the sheet is pressed down into contact with the upper surface of the forming portion 70 so as to form a more or less pan-like structure as indicated in Fig. 8. The next operation is illustrated in Fig. 9 which indicates that the handle 128 is grasped by an operator and the spout member 126 is moved to a position over the gelatine sheet 130, upon the occurrence of which a predetermined quantity of the liquid with which the capsules are to be filled is discharged into the central portion of the sheet 130, as indicated at 132. The spout member 126 is then swung back into normally inoperative position and, as illustrated in Fig. 10, a second sheet of gelatine 134 is then superimposed upon the first sheet of gelatine 130 and the bath of liquid 132 therein. Preferably a manually operated roller or other means (not shown) is employed in a conventional manner to press any entrapped air from between the sheets 130 and 134 during this last operation. The lower die half 62, after the operation illustrated in Fig. 10 is completed, is then completely loaded and ready for insertion in the press upon which it may be slid along the table 120 until it becomes aligned with the guides 100 upon which it may be slid home between the guides 100 upon the upper face of the lower platen 48. The upper die 60 together with its corresponding guides 90 may then be pivoted downwardly to the position indicated in Fig. 2 and the upper die half 60 slid inwardly to its proper location over the lower die half 62, and the press operated to effect formation of the capsules.

It will, of course, be understood that prior to applying actual pressure to the opposite faces of the gelatine sheets 130 and 134, the marginal edges of the gelatine sheets must be sealed against the escape of the liquid bath 132 from between the same. In the present case this is accomplished as best illustrated in Fig. 6 from which it will be noted that the central opening in the frame member 72 at its plane of smallest dimensions is such as to closely receive the outer edges of the forming member 66 of the upper die half 60 therein, and the inner edges of the frame member 62 are beveled upwardly and outwardly from the lower edge thereof. Accordingly, when the upper and lower die halves 60 and 62, respectively, are properly positioned in the press and the press operated to bring the platens 44 and 48 and consequently the upper and lower die halves 60 and 62, respectively, toward one another, during the initial movement of the die halves toward one another the lower edge corners of the forming member 66 of the upper die half 60 will engage the overlapping marginal edges of the gelatine sheets 130 and 134 and will tend to wedge them against one another between such lower edge corners and the beveled inner faces of the frame 72. Shortly after the initial engagement of the lower outer edges of the forming member 66 with the gelatine sheets during upward movement of the lower platen 44, the gelatine sheets will be securely forced together and welded to one another along the line of pressure indicated sufficiently to prevent the escape of the liquid bath 132 from between them. As soon as this effect is completed or shortly thereafter during continued approach of the die halves, the operative faces of the upper and lower die halves will act against the outer faces of the gelatine sheets 130 and 134 and serve to compress the liquid bath 132 between the opposed or inner faces of the gelatine sheets, and as this compressing action continues during relative advancement of the two die halves toward one another it will be observed that the only path of escape for such liquid between the die halves is substantially only the spaces provided by the various matching openings 74, and the liquid bath 132 in attempting to escape over the areas of these openings will stretch the gelatine sheets 130 and 134 into such openings and into more or less globular form. Advancement of the die halves toward one another continues until substantially all of the liquid bath 132 has been squeezed into the areas of the openings 74, and the cutting edges of the dies surrounding the openings 74 contact one another and cause the gelatine sheets to be severed and welded together about the margins of each opposed pair of openings 74 thereby completely forming the capsules therein and bringing them to the condition indicated in Fig. 11. At the same time the gelatine sheets will preferably be severed along the line of pressure between the forming member 66 and the inner face of the frame 72. Upon the completion of this operation the press is operated to separate the platens 44 and 48 and consequently the die halves 60 and 62 upon which the upper die half 62 will be withdrawn to between the guides 90 and pivoted upwardly to the position indicated in Fig. 3 in which its lower face is fully exposed to permit brushing off whatever capsules may have adhered thereto, and the lower die half 62 may be withdrawn upon the table 120 and its upper surface freed of the capsules formed thereon and such waste as may have been formed in the operation. Preferably a removable tray 136 (see Fig. 3) is provided below the table 120 for reception of the capsules and waste brushed off the die halves 60, 62, and a shield 138 may be provided on the forward face of the platen 48 to deflect the capsules into the tray 136.

In order to render the operation of the press more or less automatic and at the same time to insure proper positioning of the die halves 60 and 62 therein as a condition precedent to the operation of the press, the following mechanism is provided. At the rear edge of both the upper and lower platens 44 and 48, respectively, a switch mechanism indicated generally at 140 is suitably supported in fixed relation therewith, the lower switch element 140 being bodily movable with the lower platen 48. As best illustrated in Fig. 7 each of the switch elements 140 is provided with an operating knob 142 and a lever 144 pivoted thereto as at 146, the rear end of each lever 144 being slotted as at 148 and the slotted portion thereof receiving the corresponding knob 142 therein. The opposite end of the lever 144 projects forwardly to a position adjacent the operative face of the corresponding platen 44 or 48 and such end is provided with a roller 150 thereon. The rear face of each of the die halves 60 and 62 is provided with a forwardly projecting pin 160 positioned for interengagement with the corresponding roller 150 when such die half is moved into fully operative position with respect to its corresponding platen 44 or 48. Spring means (not shown) contained within each switch element 140 constantly tends to move the corresponding arm 144 so as to bring the corresponding roller 146 into adjacent relationship with respect to the operative face of the corresponding platen, in which position the corresponding switch 140 is in open circuit position, and as each die half is moved rearwardly with respect to its platen and immediately before it is brought into contact with its corresponding rearward stop 88 or 108 as the case may be, the corresponding pin 50 will engage the corresponding roller 150 and through the corresponding arm 144 operate the corresponding control knob 142 to close the corresponding switch element 148. The switch elements 140 are connected in series to a circuit including a conventional control for the valve 54 for controlling the operation of the press. Consequently not only is it necessary that both of the die halves 60 and 62 be moved into fully operative relationship with respect to their corresponding platens before operation of the press may occur, but additionally the act of moving both of the die halves 60 and 62 to their fully operative position with respect to the corresponding platens of the press automatically serves to begin a cycle of operation of the press. Conventional means, not shown, serve to carry the press through one cycle of operation and then stop it, and the control system for the press may include a conventional electric time element indicated generally at 154 in Fig. 4 causing a lag or dwell in the operation of the press after the operative faces of the die halves may have been actually brought into contact with each other, this being desirable from the standpoint of permitting more time to effect the weld between the two sheets of gelatine as well as to permit the employment of less pressure in the press to effect the operation.

As best indicated in Figs. 2 and 3, a hollow pad member 160 is secured to the forward side of the fixed platen 44, it being provided with an angularly arranged forward face so located that when the upper die half 60 is pivoted upwardly with the guides 90 the normally upper face of the die half 60 will lie in substantially full contact with the forward face of the pad 160. As also illustrated in the various figures, the table 120 is of hollow construction forming a water chamber 164 therein. The water pump 30 is provided with a discharge pipe 166 leading to one end of the table 120, shown in the drawings as the righthand end as viewed in Fig. 1, so as to discharge the water from the pump into the chamber 164 at such end of the table 120. As best indicated in Fig. 1 the opposite end of the chamber 164 of the table 120 is connected by means of a tube or pipe 168 into one side of the pad 160 for the upper die 60 and the water is discharged from the pad 160 through a pipe or tube 170 which leads back to the tank 26 and discharges thereinto as indicated at 172 in Fig. 3. As indicated in Fig. 3 an electrical heating element 174 is projected into the tank 26 through a wall thereof and is connected by means of a lead 176 to a relay switch 178, the operation of which is controlled by a thermostat 180 located in the chamber 164 of the table 120 and suitably connected with the relay switch 178. By this means the temperature of the water in the tank 26, table 120 and pad 160 may be raised to and maintained at a suitable temperature so that the die halves 60 and 62, respectively, in contacting the pad 160 and table 120, respectively, will absorb sufficient heat therefrom to maintain these die halves at the desired elevated temperature preferable for heating the associated gelatine sheets and facilitating the welding of one to the other. The lower die halves 62 in being loaded upon the table 120 will, of course, absorb heat therefrom, and each time the upper die half 60 is pivoted to the position illustrated in Fig. 3 during loading or unloading of the press it will similarly absorb heat from the pad 160.

Figure 13:
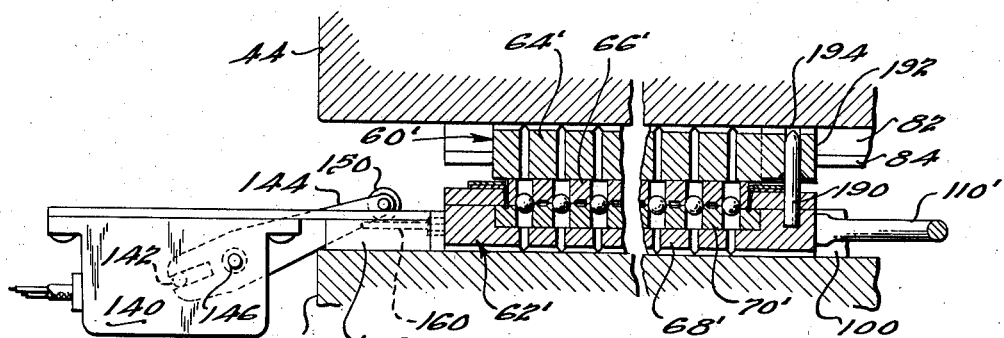
Fig. 13 is a fragmentary, broken, vertical sectional view, similar to Fig. 7, taken centrally of the modified die structure shown in Fig. 12, and illustrating the manner in which the lower die half cooperates with a single control switch to control the operation of the press.

In Figs. 12 and 13 a slightly modified form of construction is shown wherein the die halves are caused to become aligned with one another for movement into the press in a different manner than that previously described and by means of which it is only necessary to use one of the control switches 140 to effect operation of the press. Inasmuch as in Figs. 12 and 13 all of the parts shown are identical to those shown in the previous views with the exception that the die halves themselves are slightly modified, all parts are illustrated by the same numerals as in the previous views, those numerals indicating the die halves and their component parts carrying a prime mark for the purpose of differentiating them from the previously described construction. Inasmuch as the construction and operation of the mechanism illustrated in Figs. 12 and 13 is identical to that previously described except for the particular means employed to align the two die halves 60' and 62' in the press for the pressing operation, a description of these changes only will suffice to fully explain the mechanism shown in these two views.

In the construction illustrated in Figs. 12 and 13 instead of having a stop 88 on the bottom surface of the fixed platen 44 to limit rearward movement of the upper die half 60' in the press, as in the previously described construction, this stop is entirely eliminated and the lower stop 108 for the lower die half 62' only retained. In order to insure alignment of the die halves 60' and 62' during the pressing operation, the lower die half 62' is provided centrally of its forward margin with an upstanding dowel pin 190, and the upper die half 60' is provided centrally of its forward edge with a forwardly projecting lug 192 provided with an aperture 194 for reception of the dowel pin 190. When the dowel pin 190 is received in the aperture 194 of the lug 192 it aligns the die halves 60' and 62' in a forward and rearward direction while the die halves are aligned in a transverse direction in the same manner as previously described, namely by the slides 82—84 and 100, respectively. The dowel pin 190 is of sufficient height to permit it to be engaged in the opening 194 in the lug 192 prior to sliding two die halves rearwardly into operative position in the press and before the die halves have been brought together, but is not of such length as to interfere with the necessary closing movement of the press to effect formation of the various capsules.

It will be appreciated that with this construction the lower die half 62' is first entered between its guides 100, the upper die half 60' is swung downwardly form the position illustrated in Fig. 12 to a position somewhat as illustrated in Fig. 2 and in such a manner as to enter the dowel pin 190 in the opening 194, and then both die halves are moved rearwardly in the press until the lower die half 62' abuts the stop 108. The handle 110' which in this case is secured centrally to the forward edge of the lower die half 62' facilitates this movement. A handle 196 is secured to a side of the upper die half 60' in this construction to facilitate manipulation of the upper die half.

It will also be appreciated that with this modified construction, inasmuch as the dowel pin 190 serves to lock the die halves 60' and 62' together for equal and aligned longitudinal movement, it is unnecessary to employ two control switches 140 as one will suffice under such conditions, and this is shown as cooperating with the lower die half 62'. Accordingly, and as illustrated in Fig. 13, only one of the control switches 140 is employed and is adapted to be operated by the pin 160 secured to the lower die half 62' and acting on the roller 150 carried by the double armed lever 144 in identically the same manner as previously described. It will be understood that the single switch 140 in Fig. 13 is connected into the control system for the press in the same manner as previously described, the second control switch merely being eliminated from the system.

It will be appreciated from the above description that the machine shown and described provides means whereby the production of capsules of the type described may be greatly facilitated and the capacity of a press greatly increased as compared to conventional practices. It will also be appreciated that the operation of the press is semi-automatic, is safe from the operator's standpoint inasmuch as it requires the use of both the operator's hands on the handles for the two die halves to effect operation of the press, that operation of the press is prevented unless both die halves are forced fully home, thereby eliminating possibility of spoilage of any capsules during the manufacturing operation, and that the machine will maintain the gelatine sheets at a temperature most favorable to the forming operation.

Formal changes may be made in the specific embodiment of the invention described without departing from the spirit or substance of the broad invention, the scope of which is commensurate with the appended claims.

What we claim is:

1. In a machine for forming liquid filled gelatine capsules and the like, in combination, a platen, a die member associated therewith, and means for slidably guiding said die member into and out of operative engagement with respect to said platen, said means projecting laterally beyond said platen and including a hinged section whereby said die member may be transferred to said hinged section and swung bodily therewith out of its normal plane of operation.

2. Mechanism for forming liquid filled gelatine capsules and the like including, in combination, a pair of relatively movable platens, a pair of unconnected die members cooperable to provide a forming recess between them, one of said die members being slidably associated with one of said platens and the other of said die members being slidably associated with the other of said platens, means for guiding each of said die members for slidable movement with respect to its corresponding platen from an operative position interposed between opposite platens to a position exteriorly thereof, means controlling the movement of said platens relative to one another including a control element associated with each of said platens, and means cooperable between each of said control elements and the die member associated with the corresponding platen for effecting operation of said control elements only when both of said die members are moved to fully operative position with respect to said platens.

3. In a machine for forming liquid filled gelatine capsules and the like, in combination, a pair of relatively movable platens, means for effecting relative movement between said platens, a capsule forming die member associated with one of said platens, means including a movable member positioned exteriorly of said one of said platens for slidably guiding said die member into and out of operative relation with respect to its corresponding platen, said die member being movable with said movable member when associated therewith after withdrawal from its corresponding platen, and means positioned in the path of movement of said movable member for transferring heat to said die member.

4. In a machine for forming liquid filled gelatine capsules and the like, in combination, a pair of relatively movable platens, means for effecting relative movement between said platens, a pair of guides fixed with respect to one of said platens and including pivotable sections located laterally beyond said platens, a die member slidably associated with said guides and movable therebetween from a position wholly supported by said pivotable sections to an operative position between said platens, a pad positioned to receive and contact said die member when carried by said pivotable sections and pivoted out of the plane of the operative face of said platen, and means for maintaining said pad at an elevated temperature whereby to effect a transfer of heat to said die member when in contact therewith.

5. In a machine for producing liquid filled gelatine capsules and the like, in combination, a pair of relatively movable platens, means for effecting relative movement between said platens, a capsule forming die member slidably associated with each of said platens, one of said die members being bodily removable from said machine, the other of said die members being removable with respect to its corresponding platen, means constraining the last mentioned die member to a predetermined path of movement upon removal from its corresponding platen, a table positioned to receive and support said bodily removable die member, means for maintaining said table at an elevated temperature whereby to transfer heat to said first mentioned die member when received thereby, a pad adapted to limit movement of the second mentioned die member upon removal from its corresponding platen, and means for maintaining said pad at an elevated temperature whereby to transfer heat to the corresponding die member when in contact therewith.

6. In a machine for forming liquid filled gelatine capsules and the like, in combination, a pair of relatively movable platens, means for effecting relative movement between said platens, a pair of capsule forming die members, means associated with said platens for slidably receiving said die members in operative relation with respect to said platens and permitting ready removal of said die members from their corresponding platens, means exteriorly of said platens for receiving and supporting said die members when removed therefrom, and means for maintaining the last mentioned means at an elevated temperature whereby to transfer heat to said die members when received thereby.

7. In a machine for forming liquid filled gelatine capsules and the like, in combination, a support, a pair of fluid containers within said support, a press including a pair of relatively movable platens carried by said support, means for pumping fluid out of one of said containers to said press for effecting actuation thereof, a die member removably associated with one of said platens, hollow means for receiving said die member when removed from its corresponding platen, means for circulating fluid from the other of said tanks through said hollow means, and means for heating the last mentioned fluid.

8. In a machine for forming liquid filled gelatine capsules and the like, in combination, a pair of relatively movable platens, means for effecting relative movement vertically between said platens, a capsule forming die member associated with one of said platens, means connecting said die member to said platen for horizontal sliding movement from a position between said platens, said last named means being constructed to permit pivotal movement of said die member to a substantial vertical position upon completion of said sliding movement, and means positioned in the path of pivotal movement of said die member and adjacent the die member when it is in said vertical position for transferring heat to said die member.

9. In a machine for forming liquid filled gelatine capsules and the like, in combination, a pair of relatively movable platens, a die half associated with each of said platens, means slidably guiding one of said die halves with respect to its corresponding platen, said means enabling complete disconnection of said die half from its platen upon sliding movement in said guiding means during normal operation, means connecting the other of said die halves with its corresponding platen for sliding withdrawal of said die half from operative relation with respect to its platen without disconnection of said die half with respect to its platen, said last named means being constructed to permit pivotal movement of said other die half upon completion of sliding withdrawal, and means secured to one of said die halves and engageable with the other die half for causing said die halves to slide out of operative relation with said platens as a unit, said last named means being disengaged when said other die half is pivoted out of its plane of sliding movement.

10. In a machine for forming liquid filled gelatine capsules and the like, in combination, a pair of relatively movable platens, a die half associated with each of said platens, means slidably guiding one of said die halves with respect to its corresponding platen, said means enabling complete disconnection of said die half with respect to its platen upon sliding movement in said guiding means during normal operation, and means connecting the other of said die halves with its corresponding platen for sliding withdrawal of said other die half from operative relation with respect to its corresponding platen without disconnection of said other die half with respect to said machine, said last mentioned means being operable to permit pivotal movement of said other die half with respect to its platen upon completion of said sliding withdrawal.

ALFRED W. KATH.
ARTHUR COLTON.